March 13, 1934.   A. T. POTTER   1,950,628
WINDSHIELD OPERATING MECHANISM
Filed Oct. 4, 1930   2 Sheets-Sheet 1
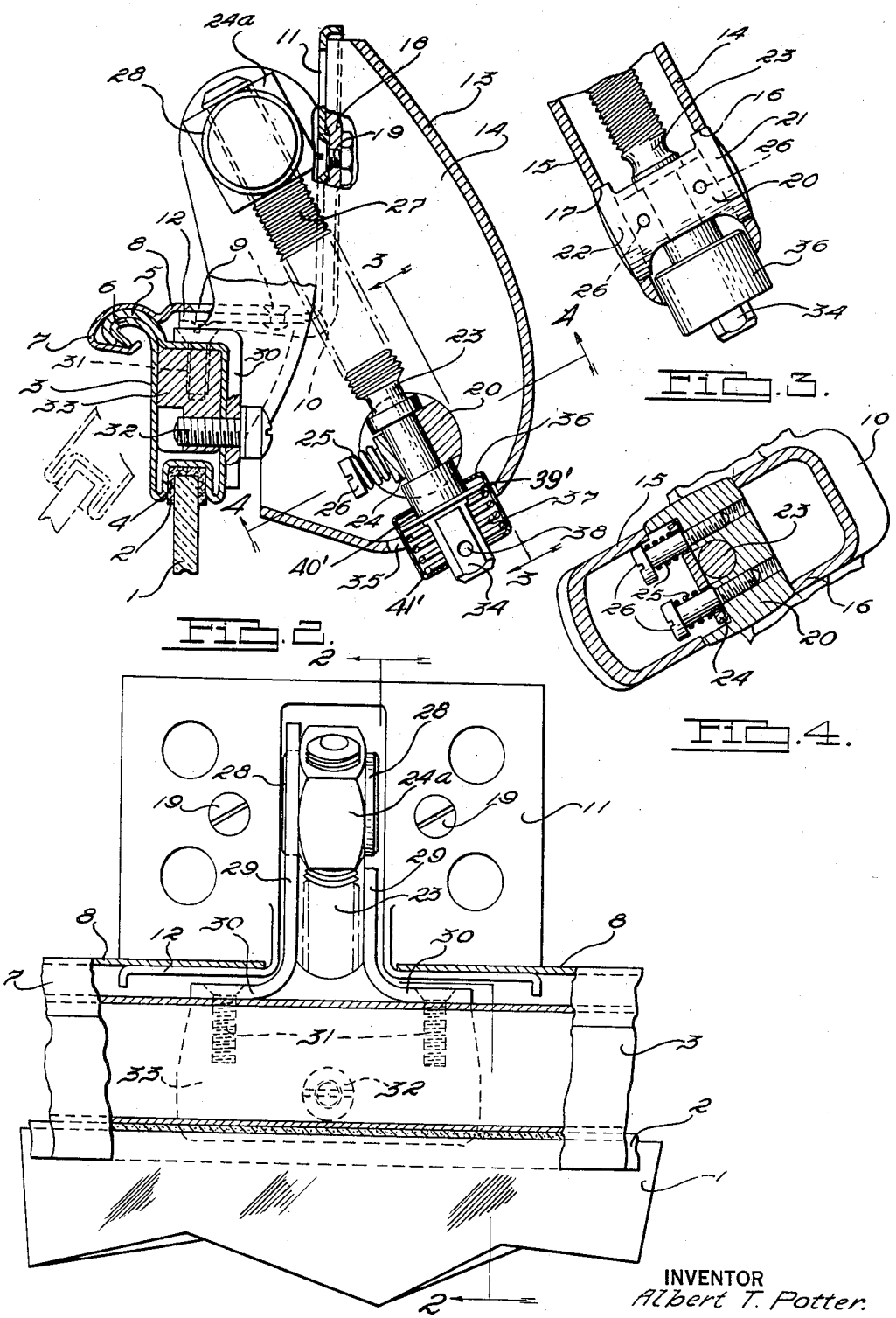
INVENTOR
Albert T. Potter.
BY
ATTORNEYS.

March 13, 1934.  A. T. POTTER  1,950,628
WINDSHIELD OPERATING MECHANISM
Filed Oct. 4, 1930  2 Sheets-Sheet 2
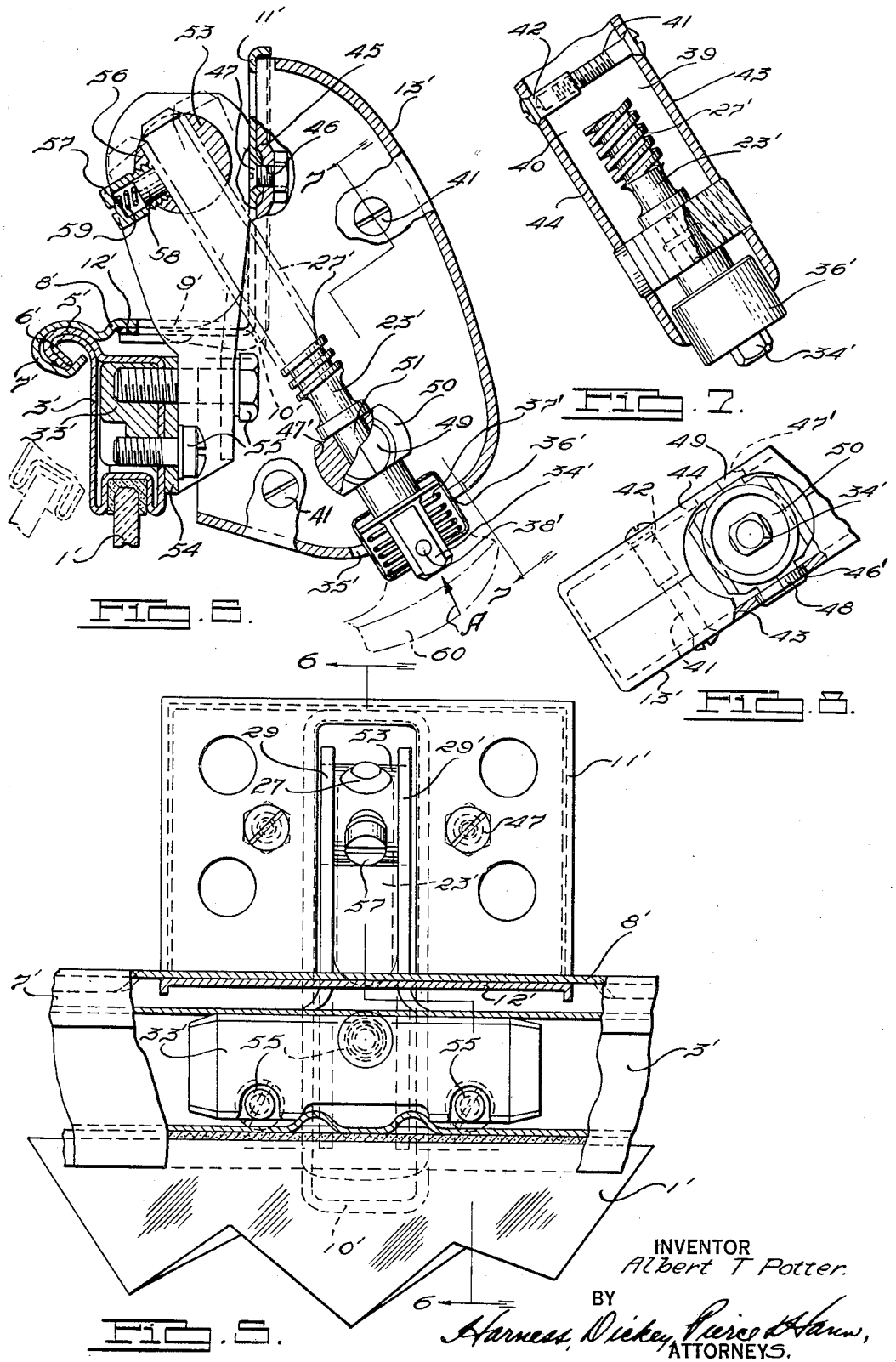
INVENTOR
Albert T Potter.
BY
Harness, Dickey, Pierce & Hann,
ATTORNEYS.

Patented Mar. 13, 1934

1,950,628

UNITED STATES PATENT OFFICE 1,950,628

WINDSHIELD OPERATING MECHANISM

Albert T. Potter, Detroit, Mich., assignor to Ainsworth Manufacturing Corporation, a corporation of Michigan Application October 4, 1930, Serial No. 486,357

2 Claims. (Cl. 296—84)

This invention relates to improved windshield supporting and operating mechanism particularly for motor vehicle windshields.

The main objects of the invention are to provide an improved means for swingably supporting a windshield; to provide improved operating mechanism for opening and closing a windshield which is adapted to secure the windshield in closed, fully open and partially open positions; to provide improved means in mechanism of this kind which takes up for wear between the parts thereof and which frictionally holds the windshield against unintended movement by vibration and wind pressure; to provide an actuating member which has a crank at one end; to provide a pivotally mounted bearing, which is located in close proximity to the crank end of said actuating member, for swingably supporting the latter for oscillation about a transverse axis and rotatably supporting the same for rotation about its longitudinal axis; to provide a threaded connection between the windshield and the actuating member which includes a pivotally mounted nut part that is movable axially of the actuating member; to provide an improved casing for windshield operating mechanism; and to provide a split trunnion member for rotatably and swingably supporting the actuating member which is adapted to be held in an assembled relation by the side walls of the casing.

An illustrative embodiment of the invention is shown in the accompanying drawings, in which:

Fig. 1 is a front side elevational view of the windshield supporting structure and operating mechanism showing portions thereof broken away to disclose the underlying structure.

Fig. 2 is a transverse vertical sectional view taken on the line 2—2 of Fig. 1.

Fig. 3 is a fragmentary sectional view taken on the line 3—3 of Fig. 2.

Fig. 4 is a transverse sectional view of the windshield operating mechanism taken on the line 4—4 of Fig. 2.

Fig. 5 is a front side elevational view, partly in section, showing a modified form of the windshield operating mechanism.

Fig. 6 is a vertical transverse sectional view taken on the line 6—6 of Fig. 5.

Fig. 7 is a fragmentary sectional view of the modified operating mechanism taken on the line 7—7 of Fig. 6.

Fig. 8 is a fragmentary end elevational view, partly in section, showing the windshield operating mechanism as viewed from the direction indicated by the arrow A in Fig. 6.

In the form shown in Figs. 1 to 4 inclusive, a windshield glass 1 is provided on its upper edge with a yieldable U-shaped shield 2, preferably comprising felt or rubber, which is received in a longitudinal element 3 of a windshield frame. The frame element 3 is tubular in shape and is formed of sheet metal material which is depressed inwardly along the lower edge forming a groove 4 in which the shielded edge portions of the windshield glass are received. The longitudinal edge portions 5 and 6 of the sheet metal material of which the tubular member 3 is formed meet at the outer corner of the member 3 and extend outwardly therefrom in superimposed relation. These edge portions are reversely bent downwardly so as to form a bead of rounded contour which serves as a hinge element for swingably supporting the windshield.

The bead formed by the reversely bent edge portions 5 and 6 of the sheet metal material is received in an open sided bead 7 which is formed on a plate 8 that is secured by rivets 9 to an angular support 10 which includes a vertically upright side 11 and a horizontal side 12. The support 10 is preferably located substantially midway between the longitudinal extremities of the windshield and it is adapted to be seated against and secured to the header-bar, not shown, of a vehicle to which the plate 8 is also secured.

Mounted on the vertical side 11 of the support 10 is an integral metal housing 13 of substantially semi-elliptical shape having side walls 14 and 15 in which registering apertures 16 and 17 respectively, are formed. The outer edges of the side walls 14 and 15 have outwardly extending flanges 18 which are located adjacent the vertical side 11 of the support and which are provided with apertures for receiving bolts 19 by which the housing is mounted on the support.

A bearing 20 having trunnions 21 and 22 on its opposite sides journaled in the apertures 16 and 17, respectively, of the sides of the housing extends transversely across the interior of the latter. Journaled in the bearing 20 is a threaded actuating member or shaft 23 which is held against displacement from the bearing 20 by a bearing cap 24 and serves as a driving element of the mechanism. The bearing cap 24 is resiliently urged toward the bearing 20 and shaft 23 by a pair of coil springs 25 which bear between the latter and the heads of screws 26 that extend through apertures in the bearing cap and are threaded in apertures in the bearing 20. The shaft 23 is rotatable in the bearing about its longitudinal axis and it may be oscillated or swung about the pivotal axis of the bearing which is normal to the longitudinal axis of the shaft.

Displacement of the bearing 20 longitudinally from the openings 16 and 17 is prevented by engagement of the heads of screws 26 with the inner faces of the side walls of the housing 13.

The threaded end 27 of the shaft 23 is received in a driven member or nut 24a which has trunnions 28 on its respectively opposite sides. The trunnions 28 are journaled in apertures formed at the end portions of arms 29 which have angular flanges 30 at their lower ends. The flanges 30 engage the upper and inner sides of the tubular member 3 and they are firmly secured to the latter by screws 31 and 32 which are threaded in apertures formed in a block 33 that is located within the tubular member 3.

The right hand end 34 of the shaft 23, as viewed in Fig. 2, extends through an aperture 35 in the peripheral wall of the housing 13 and it is rectangular in cross section. That portion of the shaft which extends through the aperture 35 carries a cylindrical casing 36 which is smaller in diameter than the diameter of the aperture 35. This casing surrounds a portion of the rectangular section of end 34 of the shaft and it contains a spring 37 which is adapted to hold a pin 38 in place. The pin 38 is adapted to coact with an operating handle or crank, indicated at 60 in Fig. 6 to lock said shaft end 34 and the operating crank in assembled relation. The actuating member, or shaft 23, may be rotated by crank 60.

A washer 39' is mounted on end 34 of shaft 23 so as to bear against a shoulder 40' provided on said shaft. The spring 37 bears against this washer and against an inturned flange 41' on casing 36 normally to bias said casing outwardly into contact with the crank, indicated at 60 in Fig. 6. This construction provides for easy assembly of the crank and shaft in locked relation. To lock the crank on shaft 23 the casing 36 containing spring 37 and washer 39' is mounted on end 34 of shaft 23. The crank 60 is then placed on end 34 with openings therein, not shown, registering with the opening for pin 38. The casing 36 is forced upwardly against the reaction of spring 37 until pin 38 can be inserted through the above mentioned openings and casing 36 released so that spring 37 circumscribes the crank end and pin 38 to prevent dislodgement of said pin. To disassemble these elements casing 36 is simply forced upwardly until the casing and spring 37 clears the pin. The pin 38 is then removed and the crank drawn from the end of the shaft, and if desired, the casing 36 and its contents removed in the same manner, or if desired, the casing and its contents may be locked on end 34 by replacing pin 38 and allowing the casing 36 and spring 37 to circumscribe the pin 38 as before.

In operation, rotation of the shaft 23 in a clock-wise direction moves the nut 24a axially of the shaft towards the interior of the housing 13 and draws the upper ends of the arms 29 inwardly in respect to the housing 13. This inward and downward movement of the upper ends of the arms 29 causes the lower ends thereof to swing the windshield outwardly about the pivot formed by the bead 7 of the supporting plate 8. During inward movement of the upper ends of the arms, the nut 24a is rotated about the axis of its trunnions and the shaft 23 is rocked about the pivotal axis of the bearing 20. This construction permits the apparatus to function in a housing of comparatively small capacity. Counter clock-wise rotation of the shaft 23 forces the upper ends of the arms 29 outwardly and returns the windshield to its closed position.

The windshield may be held in a partially open position by interrupting the rotation of the shaft when the nut 28 is between its limits of movement. The resiliently urged bearing cap holds the journaled portion of the shaft in engagement with its bearing seat and frictionally resists unintended rotation of the shaft while at the same time taking up for wear between the engaged surfaces of the bearing and shaft.

The shaft 23 is rotatably mounted and swingably supported in close proximity to its crank operated end and at a location between the latter and the threaded end of the shaft. This arrangement permits the threaded end of the shaft to travel through a substantially large circumferential distance without materially displacing the crank operated end of the shaft.

In the form shown in Figs. 5 to 8 inclusive, a windshield which includes a pane of glass 1' is mounted in a tubular frame member 3' which is substantially identical in structure to the member 3 shown in the preferred form of the invention. The tubular member 3' has a bead which is formed of superimposed edge portions 5' and 6' of the sheet metal material which is received in a bead 7' of a plate 8'. The plate 8' is mounted by rivets 9' on a support 10' which has a vertical side 11' and a horizontal side 12', the above structure being identical to that shown in Figs. 1 to 4 inclusive.

Mounted on the vertical side 11' of the support is a casing 13' which includes complimentary sections 39 and 40 which are held together by threaded male and female members 41 and 42 respectively. The sides 43 and 44 of the sections are provided with outwardly directed flanges 45 having apertures 46 through which bolts 47, mounted on the vertical side 11' of the support, extend. The bolts 46 firmly hold the sections of the housing in place.

The sides 43 and 44 of the housing are provided with registering apertures 46' and 47' respectively in which are journaled trunnions 48 and 49 on the sides of a split bearing 50. The bearing 50 and the trunnions thereof are split centrally forming two sections which are assembled on a journaled part 51 of a threaded shaft 23' from respectively opposite sides of the shaft. These sections of the bearing are held together by the walls of the openings 46' and 47' of the sides of the housing and they are secured against transverse movement with respect to the shaft by the journaled portion 51 of the latter. This construction permits the shaft 23' to rotate about its longitudinal axis and to oscillate about the pivotal axis of the trunnions.

The upper threaded end 27' of the shaft 23' is received in a threaded aperture of a cylinder 53 which is journaled at its ends in apertures formed at the upper and portions of arms 29'. The arms 29' are provided at their lower ends with flanges 54 which are rigidly secured to the member 3' of the windshield by bolts 55 that are threaded in a block 33' located in the interior of the tubular member 3'.

The cylinder 53 is provided with a radially disposed passage 56 in which a closed end nipple 57 is threaded. A shoe or plunger 58 is slidably mounted in the nipple 57 and is resiliently urged against the threads of the shaft 23' by a spring 59 which takes up for wear of the threads of the cylinder 53 and shaft 23', respectively. The plunger 58 also helps to frictionally hold the shaft 23 against unintended rotation and thereby prevents the windshield from being displaced from an adjusted position. The lower end of the shaft 23' extends through an aperture 35' having a rectangular cross-section on which a casing 36' is mounted. The casing 36' contains a spring 37' which bears against a pin 38' holding the same against displacement from the shaft. The pin 38' is used to connect a crank or handle, a part of which is shown in dotted lines at 60, to shaft 23 in the same manner as previously explained.

The operation of the mechanism shown in Figs. 5 to 8 inclusive is substantially identical to the operation of the preferred form of my invention shown in Figs. 1 to 4 inclusive.

Although but two specific embodiments of this invention have been herein shown and described, it will be understood that numerous details of the construction shown may be altered or omitted without departing from the spirit of this invention as defined by the following claims.

I claim:

1. A windshield operating mechanism comprising arms adapted to be secured rigidly to a windshield frame, a trunnion extending between the arms and journaled therein, a casing having bearing openings formed in the side walls thereof, a bearing member disposed in the openings, said bearing member having a groove formed therein, a screw journaled in said groove and having threaded engagement with said trunnion, a cover member secured to the bearing member over the groove for maintaining the bearing portion of the screw in position, and removable means associated with the cover member for preventing longitudinal displacement of the bearing member from the bearing openings in the casing side walls.

2. A windshield operating device comprising arms adapted to be fixed to a windshield, a trunnion journaled in the arms, an integral casing adapted to be rigidly fixed to the vehicle body, said casing having lateral openings formed therein, a second trunnion journaled in the openings, a screw journaled transversely in a groove in the latter trunnion and having threaded engagement with the first mentioned trunnion, removable means for closing the groove, the means including means which when in position prevents axial displacement of the second mentioned trunnion from the openings in the casing.

ALBERT T. POTTER.